United States Patent [19]

Henze et al.

[11] Patent Number: 4,885,675

[45] Date of Patent: Dec. 5, 1989

[54] TRANSFORMER ISOLATED AC TO DC POWER CONDITIONER WITH RESISTIVE INPUT CURRENT

[75] Inventors: Christopher P. Henze, Eagan, Minn.; James A. Smith, Hudson, Wis.

[73] Assignee: Unisys Corporation, Blue Bell, Pa.

[21] Appl. No.: 254,635

[22] Filed: Oct. 7, 1988

[51] Int. Cl.[4] .................... H02M 3/337; G05F 1/70
[52] U.S. Cl. ..................................... 363/26; 363/45; 363/133; 323/207; 323/211
[58] Field of Search .................... 363/25, 26, 45, 46, 363/97, 131, 133; 323/205–211

[56] References Cited

U.S. PATENT DOCUMENTS

| | | |
|---|---|---|
| 4,642,745 | 2/1987 | Steigerwald et al. ............ 363/26 X |
| 4,678,984 | 7/1987 | Henze .................................. 323/285 |
| 4,680,689 | 7/1987 | Payne et al. ......................... 363/26 |
| 4,761,725 | 8/1988 | Henze .................................. 363/46 |

Primary Examiner—Patrick R. Salce
Assistant Examiner—Emanual Todd Voeltz
Attorney, Agent, or Firm—Glenn W. Bowen; Robert S. Bramson

[57] ABSTRACT

A single stage power conditioner which produces an isolated DC output while drawing resistive input current from the utility has been described. A high frequency switch-mode technique was used which operates in continuous conduction mode to reduce electromagnetic interference (EMI) generation and ripple losses.

2 Claims, 1 Drawing Sheet

TRANSFORMER ISOLATED AC TO DC POWER CONDITIONER WITH RESISTIVE INPUT CURRENT

BACKGROUND OF THE INVENTION

Field of the Invention. This invention relates to switch-mode power conditioning circuits which provide regulated DC output power from an AC power source while drawing resistive, (i.e., sinusoidal), input current in applications where harmonic current generation in the utility distribution and generation system must be minimized. In particular, the invention relates to a switch-mode power conditioner which produces a transformer isolated 200 Vdc output at 450 watts from a 120 Vac (60 Hz to 400 Hz) power source while drawing resistive input current.

BACKGROUND ART

The conditioner of this invention utilizes a single switch-mode power processing stage that operates in a continuous conduction mode. U.S. Pat. No. 4,761,725 entitled "Digitally Controlled A.C. to D.C. Power Conditioner" which issued Aug. 2, 1988 to Christopher Paul Henze is assigned to the assignee of the present invention, Unisys Corporation. In this patent an A.C. to D.C. power conditioner, which draws sinusoidal input current, utilizes digital proportional-integral control to provide output voltage regulation by adjusting the gain of a current program loop. The current program loop controls the state of a power switch to force the instantaneous average current in an inductor to follow the instantaneous rectified line voltage. Variable hysteresis control provides noise immunity by increasing the ripple current in an iron-cored filter inductor when the instantaneous input voltage is high. Digital proportional-integral (PI) control provides output voltage regulation by adjusting, in discrete steps, the gain of the current program loop. A multiplying digital-to-analog converter serves as an interface between the voltage regulation loop and the current program loop. The sampling rate of the PI controller is determined by the input line frequency, which allows good transient response to be obtained. The current program loop forces the current drawn by the power conditioner to follow the input A.C. line voltage, thereby electronically emulating a resistor. The D.C. voltage output in the disclosed embodiment is direct coupled rather than transformer coupled. In the present invention transformer coupling is implemented.

Some previous switch-mode power conditioning techniques have utilized two cascaded power processing stages to perform the same function, others have used a single power processing stage which operated with discontinuous input current. U.S. Pat. No. 4,680,689 issued July 14, 1987 in the name of Donald W. Payne entitled "Three-Phase AC to DC Power Converter with Power Factor Correction" shows a transformer isolated AC to DC power conditioner. In the Payne circuit, the bases of transistors Q1 and Q2 are connected to control circuit 34 which includes a timer or oscillator which may consist of, for example, a bistable multivibrator which outputs a train of timing pulses of preselected duration and frequency. During the period between successive timing pulses from control circuit 34, the energy stored in inductor 24 flows through the primary of transformer 20 and is thus coupled to the load 28 through a pair of blocking diodes 36. The duration for which transistors Q1 or Q2 must remain off, i.e., the duration between successive timing pulses from control circuit 34, must be long enough to permit substantially the entire energy stored in inductor 24 to be transferred through transformer 20 to the load 28. The flyback power converter of the Payne patent differs appreciably, therefore, from the improved power converter of the present invention. A significant difference is the power converter of the present invention has the capability not found in the Payne patent of correcting for harmonics that are introduced due to inductive non-linearity, and it has the ability to operate from a single phase AC source as well as three phases.

SUMMARY OF THE INVENTION

A transformer isolated AC to DC power conditioner is provided with a resistive input current by switching two transistors that are coupled to the primary winding of an output transformer under the control of constant frequency pulse width modulated signals. These signals are provided in response to an error signal that is a function of the difference between a signal that represents the instantaneous average input voltage to the power conditioner and one that represents the instantaneous average input current to the power conditioner.

TECHNICAL DESCRIPTION OF THE INVENTION

Figure 1:
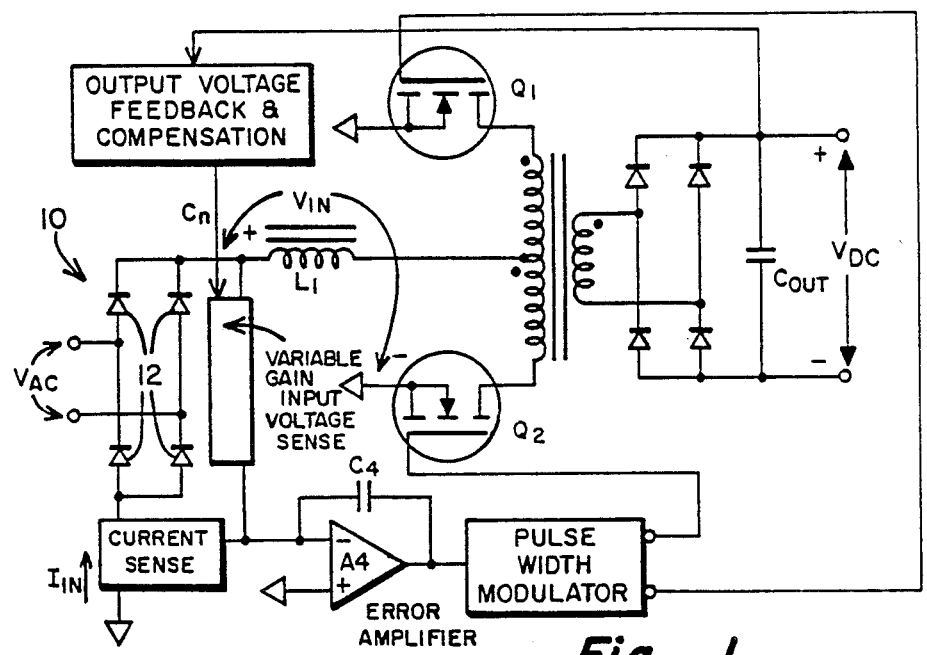
FIG. 1 is a schematic of the power converter of the present invention.

A simplified schematic of the power conditioner 10 is shown in FIG. 1. A full wave bridge rectifier 12 produces a pulsating DC voltage $V_{in}$ from which a current-fed, push-pull DC-DC power converter is operated. Inner and output feedback loops are used. The inner current program loop forces the instantaneous average input current $I_{in}$, (where the instantaneous average value denotes an average value over a high frequency switching cycle), to be proportional to the instantaneous input voltage $V_{in}$ in order to produce resistive input current characteristics.

In the present invention constant frequency operation simplifies transformer, inductor, and EMI filter design and simplifies design calculations. Only the average input current need be sensed rather than the instantaneous average input current simplifying the control circuit. Continuous input current reduces the volume, weight, and cost of input EMI filters. The outer voltage regulation loop varies the gain of the inner current program loop to regulate the DC output voltage. Varying the gain of current program loop is equivalent to varying the input resistance of the power conditioner.

The described embodiment is operated in a boost mode by providing field-effect transistors $Q_1$ and $Q_2$ with pulse-width-modulated control signals which are 180° out of phase and which have a minimum duty ratio of slightly greater than 0.5 so that both transistors will be on during each timing cycle. Bipolar transistors, IGBTs, GTOs or other suitable power switching devices could alternately be employed to implement the invention. When both transistors $Q_1$ and $Q_2$ are on simultaneously, a rectified input voltage $V_{in}$ appears across the inductor $L_1$ which causes the instantaneous input current $I_{in}$ to increase. When one transistor is on and the other is off, the difference between the output voltages which is reflected back through the transformer, and the rectified input voltage appears across the inductor and allows the inductor to discharge energy through the transformer which charges the output capacitor $C_{out}$. Input line filtering may be incorporated, if desired. However, for proper operation it is necessary to insure that a low impedance voltage source is presented to the DC-DC converter at the switching frequency.

Figure 2:
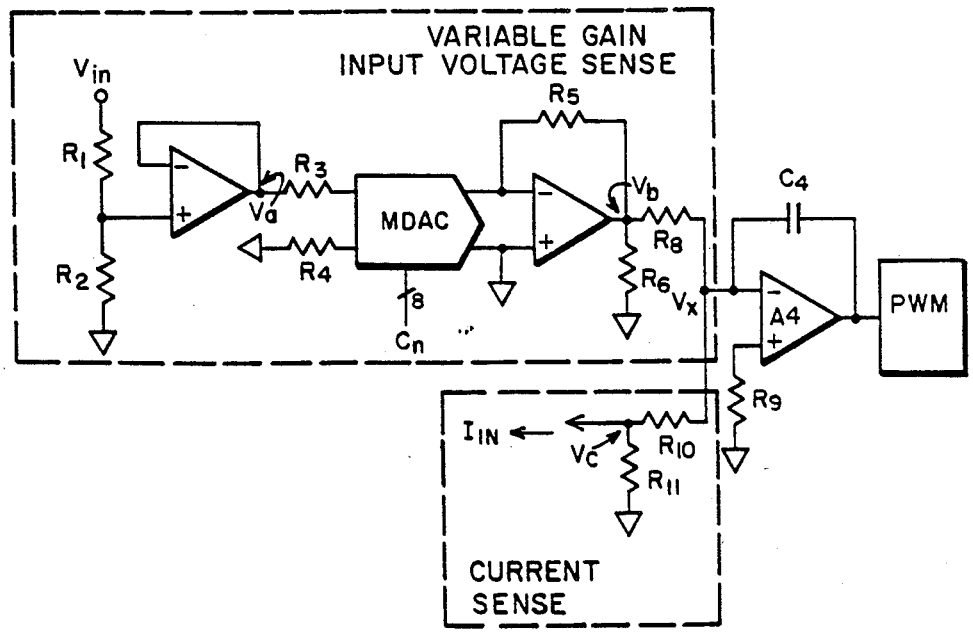
FIG. 2 is a more ample schematic of the Variable Gain Input Voltage Sense and Current Sense section of the invention.

Constant Frequency Current Programming. The current program circuitry, as shown in FIG. 2, generates constant frequency pulse-width-modulated (PWM) waveforms, which control on and off times of switches so that resistive input characteristics are obtained. The gain of the current program loop is varied slowly compared to the utility frequency to provide output voltage regulation.

A proportional-integral (PI) digital control circuit (not shown) may be used for output voltage regulation by supplying a control signal $C_n$. A detailed description of a digital control circuit that may be employed to provide $C_n$ can be found in U.S. Pat. No. 4,678,984, which is hereby incorporated by reference herein. A multiplying-digital-to-analog converter (MDAC), which may be a part of the PI controller, is used to drive the variable gain input voltage sense circuit, as shown in FIG. 2. The gain through the multiplying-digital-to-analog converter (MDAC) circuit is given by $$\frac{V_b}{V_a} = \frac{C_n R_5}{256 R_3} \quad (1)$$

where $C_n$ is an eight-bit digital number, (which ranges in decimal representation from 0 to 255), which may only be changed at zero crossings of the utility waveform by the digital PI control circuit to provide output voltage regulation by selecting one current gain.

Resistive Input Characteristics. A positive voltage $V_b$ which is proportional to the instantaneous average input voltage $V_{in}$ $$V_b = V_{in} \frac{C_n R_2 R_5}{256(R_1 + R_2) R_3} \quad (2)$$

and a negative voltage $V_c$, which is proportional to the instantaneous average input current $I_{in}$, $$V_c = -I_{in}(R_{11}) \quad (3)$$

are summed at the inverting input of an integrating error amplifier $A_4$.

Because the non-inverting input of amplifier $A_4$ is grounded, the inverting input of amplifier $A_4$ appears as a virtual ground (which may not source or sink current) for frequencies which are much less than the switching frequency and including the utility frequency. Thus:

$$\frac{V_b}{R_8} + \frac{V_c}{R_{10}} = 0 \quad (4)$$

Using Equations 2, 3 and 4 an expression for the DC input resistance of the power conditioner is found $$R_{in} = \frac{V_{in}}{I_{in}} = \frac{R_{11}(R_1 + R_2)R_3 R_8}{R_2 R_5 R_{10}} \cdot \frac{256}{c_n} \quad (5)$$

where the input resistance range from infinity to a minimum value corresponding to quantized current gain values of 0 to 256.

A switch-mode AC to DC power conditioner using a switching frequency of 100 kHz (producing a ripple frequency of 200 kHz), is a preferred implementation of the invention. The power conditioner operates from a single phase 120 Vac (50, 60, or 400 Hz) power source as well as a 120 Vdc power source. The output voltage may be selected to be 200 Vdc, at a maximum output power of 450 watts, in the described embodiment. A one-to-one turns ratio is preferred for use in the power transformer so that the peak voltage excursions of the rectified input voltage are slightly less than the DC output voltage as seen in the primary circuit. The windings are phased as signified by the black dots in FIG. 1 in the conventional manner.

The current-fed topology of the invention produces a relatively slow rising edge of the drain waveform at turn off which minimizes voltage overshoot because the output capacitance of the FET is charged from the inductor. The inductor current ripple reaches a peak-to-peak maximum value when the instantaneous input voltage is 100 V which is equal to half of the DC output voltage. The efficiency at full power is expected to be on the order of 85% or greater. In three phase applications the internal DC output filter capacitance can be greatly reduced using a single stage approach where three power conditioners are connected in parallel to a common output capacitor.

We claim:

1. An AC to DC power conditioner comprising first and second switching means having first and second controllable current-path means and first and second control means, respectively, for controlling said first and second controllable current-path means, respectively, output transformer means comprising a center tapped primary winding having a first winding section of one polarity coupled in series with said first controllable current-path means and a second winding section of an opposite polarity coupled in series with said second controllable current-path means, inductance means coupled to the center tap of said primary winding and to a source of AC input voltage, pulse width modulation means coupled to supply first and second pulse width modulated control signals to said first and second control means, respectively, drive means for driving said pulse width modulation means as a function of an error signal, variable gain input voltage sense means and input current sense means for developing first and second signals which are combined to form said error signal, and which are respectively proportional to the instantaneous average input voltage and the instantaneous average input current to said power conditioner.

2. In the power conditioner of claim 1 wherein said pulse width modulation means provides pulses of a constant pulse repetition frequency.

* * * * *